United States Patent [19]

Pollono

[11] 4,134,563
[45] Jan. 16, 1979

[54] PIPE SUPPORT

[75] Inventor: Louis P. Pollono, Hempfield Township, Hempfield County, Pa.

[73] Assignee: The United States of America as represented by the United States Department of Energy, Washington, D.C.

[21] Appl. No.: 653,044

[22] Filed: Jan. 28, 1976

[51] Int. Cl.² ............................................. F16L 3/00
[52] U.S. Cl. ..................................... 248/58; 138/99; 138/106; 138/107; 248/62
[58] Field of Search ........................... 248/49, 58, 62; 138/149, 106, 107, 99

[56] References Cited

U.S. PATENT DOCUMENTS

| | | | |
|---|---|---|---|
| 2,690,193 | 9/1954 | Smith | 138/99 |
| 3,361,870 | 1/1968 | Whitehead | 138/107 |
| 3,480,043 | 11/1969 | Proudfoot et al. | 138/99 |
| 3,496,963 | 2/1970 | Bardgette et al. | 138/99 |
| 3,530,899 | 9/1970 | Breeding | 138/107 |
| 3,575,214 | 4/1971 | Bindel | 248/62 |
| 3,850,714 | 11/1974 | Adorjan | 138/149 |
| 3,851,673 | 12/1974 | Merkle et al. | 138/107 |

Primary Examiner—Robert A. Hafer
Attorney, Agent, or Firm—Dean E. Carlson; Randall G. Erdley; C. L. McHale

[57] ABSTRACT

A pipe support for high temperature, thin-walled piping runs such as those used in nuclear systems. A section of the pipe to be supported is encircled by a tubular inner member comprised of two walls with an annular space therebetween. Compacted load-bearing thermal insulation is encapsulated within the annular space, and the inner member is clamped to the pipe by a constant clamping force split-ring clamp. The clamp may be connected to pipe hangers which provide desired support for the pipe.

7 Claims, 2 Drawing Figures

PIPE SUPPORT

BACKGROUND OF THE INVENTION

This invention was made in the course of, or under, a contract with the United States Energy Research and Development Administration, the successor-in-interest to the United States Atomic Energy Commission.

This invention relates generally to pipe supports and more particularly to pipe supports for high temperature, thin-walled piping runs of the type found in liquid-metal cooled nuclear reactors.

A nuclear reactor produces heat by fissioning of nuclear materials which are located in fuel elements and assembled within a nuclear core situated in a pressure vessel. In commercial nuclear reactors, the heat produced thereby is used to generate electricity. Such nuclear reactors typically comprise one or more primary flow and heat transfer loops, and a corresponding number of secondary flow and heat transfer loops to which conventional steam turbine and electrical generators are coupled. A typical energy conversion process for a commercial nuclear reactor, therefore, involves transfer of heat from a nuclear core to the primary heat transfer system, to a secondary heat transfer system, where it is converted into steam from which electricity is generated.

In liquid cooled nuclear reactors, such as liquid-metal cooled breeder reactors, the reactor coolant, such as liquid sodium, is circulated through the primary coolant flow system. A typical loop of the primary system comprises a nuclear core within a reactor vessel, a heat exchanger, and a circulating pump with flow conduits such as piping coupling the various components. In nuclear reactors having more than one primary coolant flow loop, the nuclear core and the nuclear reactor pressure vessel are common to each of the primary loops. The heat generated by the nuclear core is removed by the reactor coolant which flows into the reactor vessel and through the core. The heated reactor coolant then exits the reactor vessel and flows to heat exchangers which transfer the heat through intermediate heat transfer systems to corresponding secondary flow loops. The cooled reactor coolant exits from the respective heat exchangers, then flows to corresponding pumps which again circulate the coolant to the pressure vessel, repeating the described flow cycle.

Piping is used throughout both the primary and secondary heat transfer systems to provide a means for containing the liquid sodium as it flows between the various components such as pressure vessel, heat exchangers, and pumps. The piping between the reactor pressure vessel and the heat exchangers, commonly referred to as the hot legs of the primary system, experiences liquid sodium temperatures of approximately 1000° F. The piping between the heat exchanger outlets and the reactor inlets, commonly referred to as the cold leg of the primary system, is in contact with liquid sodium at temperatures of approximately 700° F. This results in a large sodium temperature differential of approximately 300° F between the hot and cold leg sections of the loop. In the unlikely event of the rapid reactor core shutdown, or similar event, the liquid sodium temperature in the hot and cold legs of the loop are rapidly equalized. This equalization can cause severe through-the-wall thermal gradients making the piping susceptible to cracking and deformation. To minimize this problem, the liquid sodium piping is generally constructed from thin-walled tubing having a wall thickness generally 0.5 inches or less.

Thin-walled piping has the ability to withstand severe thermal transients, but in large diameter sizes, support problems arise due to the heavy weight of the contents (liquid sodium) as compared with that of the piping itself. Thin-walled piping is not able to provide any significant self-support for long runs since the full-to-empty weight ratio for a large sodium piping system may be as high as 3:1, whereas for the more conventional high temperature fluid systems the ratio is close to unity.

System operation at high temperatures produces a significant linear expansion of the piping network, and constant support hangers are normally prescribed. For high temperature sodium piping systems, a difficulty that arises in the design of the support is the design of the attachment of the constant load hanger to the piping. In providing attachment, it is essential to carefully control the magnitude and distribution of stresses that can be attributed due to structural bending and thermal gradients which occur during system operation.

Selection of attachment location involves consideration of the individual piping system, the support structure to which piping runs are transmitted, and the base limitations. Pipe attachments fall into two basic categories; attachments integral with the pipe wall and attachments nonintegral with the pipe wall. In non-integral attachments, the reaction between pipe and support structure is distributed by contact. Integral pipe attachments are those attachments directly attached to the pipe such as by welding. For high temperature sodium piping, integral pipe attachments are generally not feasible. The attachment to the pipe wall would cause severe thermal transients and introduce localized stress concentration at the place of support. Likewise, non-integral attachments should not be in direct contact with the piping because of the severe thermal stresses they would cause. Therefore, in the prior art, insulation was used between the non-integral attachment and the pipe wall. The use of the insulation enables the load of the pipe at the location of the pipe support along the run to be spread over a relatively wide area, while at the same time minimizing the stresses caused by the material discontinuity.

A problem has arisen, however, with the use of the insulation between the non-integral attachment and the pipe wall. Instead of maintaining its structural integrity, the insulation has fractured and powdered. This loss of structural integrity has caused severe problems in that the clamping force is not transmitted uniformly to the pipe, thereby rendering the support non-constant. As such, the support is not reliable, and safety considerations mandate that it not be used.

SUMMARY OF THE INVENTION

The aforementioned disadvantage of the prior art is eliminated by this invention by providing a pipe support structure for high temperature, thin-walled piping. A tubular inner member is comprised of an inside wall and an outside wall, with an annular space therebetween. Thermal insulating means are encapsulated within the annular space and the inner member radially encircles the pipe to be supported. The inner member is clamped to the pipe by a constant clamping force applied by a clamping means. The use of the inner member provides a uniform clamping force on the pipe, and the insulation within the annular space minimizes the amount of heat being transferred to the clamping means. In the event of powdering or fracturing, the insulation will remain encapsulated within the inner member, thereby minimizing the difficulties caused by such powdering or fracturing.

BRIEF DESCRIPTION OF THE DRAWING

For a better understanding of this invention, reference is made to the description of the preferred embodiment, illustrated in the accompanying drawings, in which:

Referring to FIG. 1, a horizontal section of high temperature, thin-walled pipe 10, such as may be utilized to carry liquid sodium in liquid-metal cooled reactors, is spatially supported by a pipe support 12. The pipe support 12 is fixedly connected to a means 14 for maintaining the pipe support 12, and correspondingly the pipe 10, in a substantially constant spatial position. The maintenance means 14, for example, may be comprised of a constant support pipe hanger 16 which is secured to a ceiling or a structural framework 18. Although not shown, the hanger 16 may be secured to a floor.

Figure 1:
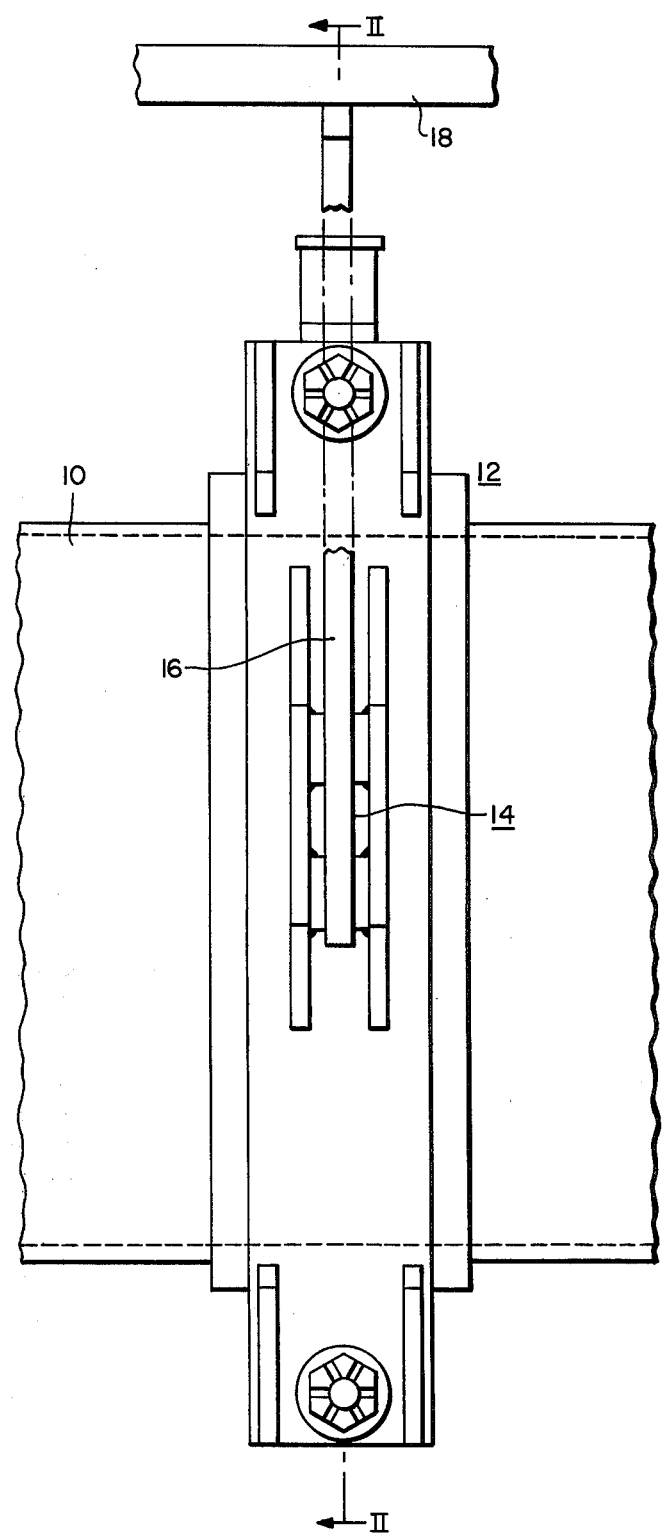
FIG. 1 is an elevational view of the support of this invention.
Figure 2:
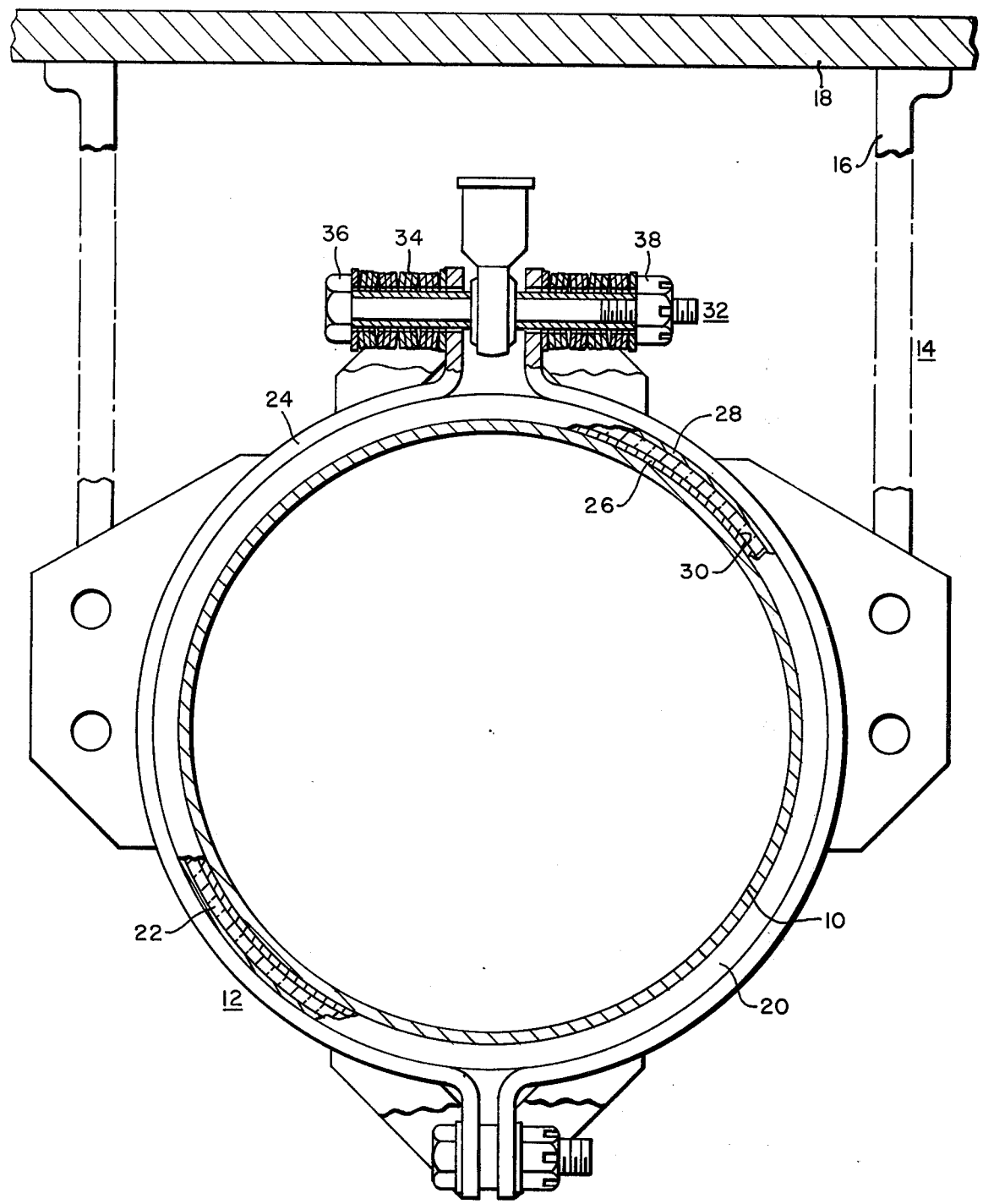
FIG. 2 is a cross-sectional view taken along line II—II of FIG. 1. DESCRIPTION OF THE PREFERRED EMBODIMENT Throughout the description which follows, like reference characters indicate like elements of the various figures of the drawings.

The pipe support 12 completely encircles the section of pipe 10 where the support 12 is located (FIG. 2). The pipe support 12 is comprised of three elements: a tubular, or cylindrical, inner member 20; a thermal insulating means 22; and clamping means 24. The inner member 20 is comprised of an inside wall 26, and an outside wall 28. An annular space 30 is located between the inside wall 26 and the outer wall 28. The inner member 20 may be, for example, a stainless steel tube with a hollowed wall.

The thermal insulating means 22 are located within the annular space 30 between the inside wall 26 and the outside wall 28. The thermal insulating means 22 may be comprised of compacted load-bearing thermal insulation. An example of this type of insulation may be a compacted mixture of diatomaceous silica, asbestos fiber, and inorganic binders. The insulation 22 is completely encapsulated within the inner member 20. This may be accomplished, for example, by filling the annular space 30 with the insulation 22, sealing the ends of the inner member 20, and compacting and shaping the insulation 22 within the inner member 20 by means such as heat treating and rolling. By being so fabricated, the insulation 22 adds structural strength and thermal insulation to the inner member 20.

The inner member 20 radially encircles the pipe 10 to be supported. The inner member 20, and more particularly the inside wall 26, has a diameter substantially equal to the outside radial diameter of the pipe 10. Clamping means 24 clamp the inner member 20 to the pipe 10 to be supported. The clamping means 24, such as a split-ring clamp, assert a substantially constant clamping force on the inner member 20. This clamping force is of a sufficient magnitude to keep the inner member 20 in place during thermal expansion and/or contraction and will not allow the support 12 to move in the event of a seismic disturbance. Analyses of the support 12 indicate that the maximum temperature on the clamp 24 will be within acceptable limits such that the preload on the clamp 24 will not relax due to creep.

The clamp 24 includes means 32 for compensating for any radial expansion of the pipe 10 to be supported. The compensating means 32 can, for example, be a plurality of parallelly connected washers 34, some of which are in opposition to the remaining washers 34. The washers 34 would be located on the bolt 36 which, together with the nut 38, close the split-ring clamp 24. By proper tensioning of the washers 34, any expansion forces generated by the expansion of the pipe 10 will be transmitted to the clamp 24, and these forces will operate against the tensioning forces of the opposing washers 34. In this manner, the expansion of the pipe 10 will be compensated for by the clamp 24 while the clamp 24 still asserts a substantially constant clamping force on the inner member 20.

The encapsulation of the insulation 22 within an inner member 20 substantially eliminates problems caused by a powdering or fracturing of the insulation 22. The clamping force exerted by the clamp 24 is transmitted through the metallic inner member 20 to the pipe 10. The insulation 22 minimizes the thermal conduction from the pipe 10 to the clamp 24, thereby rendering the use of the clamp 24 practical. Powdering or fracturing of the insulation 22 does not affect the transmittal of the clamping force from the clamp 24 to the pipe 10. In the event of such fracturing or powdering of the insulation 22, the insulation 22 will remain within the inner member 20, to thereby continue its thermal insulating, because the insulation 22 is encapsulated within the inner member 20.

It can be seen that this invention provides a nonintegral attachment for supporting horizontal runs of high temperature, thin-walled piping without the loss of effectiveness caused by fracturing or powdering of thermal insulating means.

I claim as my invention:

1. A support system comprising:
   a thin-walled pipe containing a liquid therein at an elevated temperature;
   a tubular metallic inner member comprising a tubular inside wall and a tubular outside wall, said inside wall and said outside wall forming an annular space therebetween, said inside wall having a diameter substantially equal to an outside radial diameter of said pipe, said inner member radially encircling and contacting said pipe;
   thermal insulating means located within said annular space, said thermal insulating means being encapsulated within said inner member and comprising compacted load-bearing thermal insulation; and
   means for clamping said inner member to said pipe, said thermal insulating means minimizing the amount of heat transferred from said pipe to said clamping means.

2. The system according to claim 1 wherein said insulation comprises a compacted mixture of diatomaceous silica, asbestos fiber, and inorganic binders.

3. The system according to claim 1 wherein said means for clamping comprises a split-ring clamp.

4. The system according to claim 3 wherein said clamp includes means for asserting a substantially constant clamping force on said inner member.

5. The system according to claim 3 wherein said clamp includes means for compensating for any radial expansion of said pipe.

6. The system according to claim 1 wherein said inner member is cylindrical.

7. The system according to claim 1 wherein means for maintaining a substantially constant spatial position of said system is connected to said means for clamping.

* * * * *